United States Patent
Hosaka et al.

(10) Patent No.: US 6,228,793 B1
(45) Date of Patent: May 8, 2001

(54) SOLID CATALYST COMPONENT FOR OLEFIN POLYMERIZATION AND CATALYST

(75) Inventors: Motoki Hosaka; Isa Nishiyama, both of Kanagawa (JP)

(73) Assignee: Toho Titanium Co., Ltd., Chigasaki (JP)

(*) Notice: Subject to any disclaimer, the term of this patent is extended or adjusted under 35 U.S.C. 154(b) by 0 days.

(21) Appl. No.: 09/297,055

(22) PCT Filed: Aug. 27, 1998

(86) PCT No.: PCT/JP98/03816

§ 371 Date: Apr. 28, 1999

§ 102(e) Date: Apr. 28, 1999

(87) PCT Pub. No.: WO99/11675

PCT Pub. Date: Mar. 11, 1999

(30) Foreign Application Priority Data

Aug. 28, 1997 (JP) .................................................... 9-247715

(51) Int. Cl.[7] ............................. B01J 31/00; B01J 37/00; C08F 4/02; C08F 4/60
(52) U.S. Cl. ........................ 502/125; 502/127; 502/132; 502/133
(58) Field of Search .................................. 502/125, 127, 502/132, 133

(56) References Cited

U.S. PATENT DOCUMENTS

| | | | |
|---|---|---|---|
| 4,308,170 | * 12/1981 | Mizogami et al. | 502/107 |
| 4,315,088 | * 2/1982 | Kitagawa et al. | 502/132 |
| 4,473,660 | * 9/1984 | Albizzati et al. | 502/132 |
| 4,487,845 | * 12/1984 | Triplett | 502/107 |
| 4,544,717 | * 10/1985 | Mayr et al. | 502/134 |
| 4,548,915 | * 10/1985 | Goodall et al. | 502/134 |
| 4,829,037 | * 5/1989 | Terano et al. | 502/127 |
| 4,833,111 | * 5/1989 | Nowlin | 502/107 |
| 5,494,872 | 2/1996 | Hosaka et al. . | |
| 5,498,770 | 3/1996 | Hosaka et al. . | |
| 5,684,173 | 11/1997 | Hosaka et al. . | |
| 6,034,189 | * 3/2000 | Shinozaki et al. | 502/127 |
| 6,133,189 | * 10/2000 | Fujiwara et al. | 502/125 |

FOREIGN PATENT DOCUMENTS

| | | |
|---|---|---|
| 0 045 975 | * 2/1982 | (EP) . |
| 0 268 685 | * 6/1988 | (EP) . |
| 57-63310 | * 4/1982 | (JP) . |
| 57-63311 | * 4/1982 | (JP) . |
| 63-3010 | * 1/1988 | (JP) . |
| 5-301921 | * 11/1993 | (JP) . |

\* cited by examiner

*Primary Examiner*—Mark L. Bell
*Assistant Examiner*—J. Pasterczyk
(74) *Attorney, Agent, or Firm*—Oblon, Spivak, McClelland, Maier & Neustadt, P.C.

(57) ABSTRACT

The present invention provides a solid catalyst component for polymerization of olefins prepared by allowing a magnesium compound, a titanium compound and an electron donor compound to come in contact with each other, and having a value that a parameter of S1/S2 determined by Raman spectroscopic analysis is not less than 0.5 and not more than 10, wherein S1 and S2 are the values determined by Raman spectroscopic analysis, and S1 is a value of peak area of the strongest peak appeared in the range from 360 to 520 $cm^{-1}$ and S2 is a value of peak area of the strongest peak appeared in the range from 160 to 340 $cm^{-1}$. A catalyst comprising the solid catalyst component, an organic aluminum compound and an organic silicon compound is superior in hydrogen response and can produce a polymer of olefins having a high stereoregularity in a high yield.

10 Claims, 1 Drawing Sheet

SOLID CATALYST COMPONENT FOR OLEFIN POLYMERIZATION AND CATALYST

TECHNICAL FIELD

The present invention relates to a solid catalyst component and catalyst for polymerization of olefins, which show high activity and good hydrogen response and can provide a polymer having a high stereoregularity in a high yield.

TECHNICAL BACKGROUND

Many proposals have been made and known for a solid catalyst component containing magnesium, titanium, an electron donor compound and halogen as essential components and a process for the polymerization or the co-polymerization of olefins in the presence of a catalyst for polymerization of olefins comprising said solid catalyst component, an organic aluminum compound and an organic silicon compound. For example, JP-A-57-63310 and JP-A-57-63311 (The term "JP-A as used herein means an "unexamined published Japanese patent application") propose a process for polymerizing an olefin having 3 or more carbon atoms using a catalyst system comprising a solid catalyst component containing a magnesium compound, a titanium compound and an electron donor compound, an organic aluminum compound and an organic silicon compound having Si—O—C bond. However, these processes are not always satisfactory for obtaining highly stereoregular polymers in a high yield, and further improvement has been demanded.

On the other hand, JP-A-63-3010 discloses a catalyst system for the polymerization of olefins and a process for polymerizing olefins using the same, the catalyst system comprising a solid catalyst component prepared by bringing a dialkoxymagnesium, a diester of an aromatic dicarboxylic acid, an aromatic hydrocarbon and a titanium halide into contact and subjecting the resulting product in a powdered state to a heat treatment, an organic aluminum compound and an organic silicon compound. JA-A-1-315406 discloses a catalyst system for polymerizing olefins comprising a solid catalyst component prepared by bringing titanium tetrachloride with a suspension formed by diethoxymagnesium with an alkylbenzene, adding phthalic dichloride thereto to react to obtain a solid product, and further contacting the resulting solid product with titanium tetrachloride in the presence of an alkylbenzene, an organic aluminum compound and an organic silicon compound, and a process for polymerizing olefins in the presence of said catalyst system. The foregoing known techniques focus on the development of a catalyst component having a high activity enough to allow the omission of a so-called deashing step, i.e., a step of removing catalyst residues such as chlorine and titanium remaining in the polymer produced as well as on the enhancement of the yield of stereoregular polymer or an improvement in durability of the catalyst activity for polymerization, and achieved excellent results to these purposes.

The polymer obtained by using the foregoing catalyst is utilized in various uses, e.g., a container or a film other than a molded product of automobile or household appliances. These products are molded in various kind of molding machines by melting a polymer powder produced in polymerization. Especially, when a large molded product is produced by injection molding, there is a case that a high flowability (melt flow) of a melting polymer is needed. For such case, many researches are made in order to improve the melt flow of a polymer.

The melt flow depends on the molecular weight of a polymer greatly. In this field, an addition of hydrogen as a control agent for molecular weight of a polymer is conducted generally at the polymerization of olefins. In this case, when a polymer having a low molecular weight is produced, i.e., a polymer having high melting flow is produced, much hydrogen is added at the polymerization. However, there is a limitation for the amount of hydrogen that can be added because the capacity to resist pressure from the standpoint of safety. In order to add much hydrogen, it can not avoid reducing the partial pressure of monomer to be polymerized. In that case, the productivity deteriorates. Further, since much hydrogen is used, there is a problem on the cost. Therefore, it is desired to develop a catalyst that can produce a polymer having a high melt flow at fewer hydrogen, i.e., a catalyst that shows a high hydrogen response and can produce a high stereoregular polymer in a high yield. However, the foregoing known techniques are not enough to solve the problems.

As a result of extensive investigations to solve the foregoing problems remaining in the prior art techniques, the present inventors have found that a catalyst for polymerization of olefins having a high hydrogen response while maintaining a high activity and a high stereoregularity can be obtained by using a solid catalyst component containing magnesium, titanium, an electron donor compound and a halogen atom as essential components and satisfying a specific condition of a parameter obtained by Raman spectroscopic method, and thus completed the present invention.

The objective of the present invention is to solve the foregoing problems remaining in the prior art techniques and to provide a solid catalyst component and a catalyst for polymerization of olefins having a higher hydrogen response and a high activity, which can be obtained a high stereoregular polymer in a high yield.

DISCLOSURE OF THE INVENTION

The solid catalyst component of the present invention is a component containing magnesium, titanium, an electron donor compound and a halogen atom, which is prepared by allowing a magnesium compound, a titanium compound and an electron donor compound to come in contact with each other and satisfies the following equation (1);

$$0.5 \leq S1/S2 \leq 10 \tag{1}$$

wherein S1 and S2 are values which are determined by Raman spectroscopy analysis, S1 is a value of peak area of the strongest peak appeared in the range from 360 to 520 cm$^{-1}$ and S2 is a value of peak area of the strongest peak appeared in the range from 160 to 340 cm$^{-1}$.

The catalyst for polymerization of olefins of the present invention comprises
(A) the foregoing solid catalyst component,
(B) an organic aluminum compound represented by the general formula (2):

$$R^1_p AlQ_{3-p} \tag{2}$$

wherein $R^1$ represents a $C_{1-4}$ alkyl group; Q represents a hydrogen or halogen atom; and p represents a real number of from more than 0 to not more than 3; and
(C) an organic silicon compound represented by the general formula (3):

$$R^2_q Si(OR^3)_{4-q} \tag{3}$$

wherein R represents a $C_{1-12}$-alkyl, cycloalkyl, phenyl, vinyl, allyl or aralkyl group which may be the same or different; $R^3$ represents a $C_{1-4}$-alkyl, cycloalkyl, phenyl, vinyl, allyl or aralkyl group which maybe the same or different; and q represents 0 or an integer of from 1 to 3.

BEST EMBODIMENT FOR IMPLEMENTING THE INVENTION

Preferred examples of the magnesium compound used for preparing a solid catalyst component (A) for polymerization of olefins of the present invention (hereinafter occasionally referred to as "solid catalyst component (A)") include magnesium dihalide, dialkylmagnesium, alkylmagnesium halide, dialkoxymagnesium, diaryloxymagnesium, alkoxymagnesium halide and fatty acid salt of magnesium, etc.

Examples of the magnesium dihalide include magnesium dichloride, magnesium dibromide, magnesium diiodide and magnesium difluoride, etc.

Preferred dialkyl magnesium is the compound represented by the general formula $R^4R^5Mg$ wherein $R^4$ and $R^5$ each represent a $C_{1-10}$ alkyl group which may be the same or different. Specific examples of such dialkylmagnesium include dimethylmagnesium, diethylmagnesium, methylethylmagnesium, dipropylmagnesium, methypropylmagnesium, ethylpropylmagnesium, dibutylmagnesium, methylbutylmagnesium and ethylbutylmagnesium, etc. Such dialkylmagnesium may be obtained by reacting magnesium metal with halogenated hydrocarbon or alcohol.

Preferred alkyl magnesium halide is the compound represented by the general formula $R^6MgD^1$ wherein $R^6$ represents a $C_{1-10}$ alkyl group, $D^1$ represents a halogen atom such as chlorine, bromine, iodine or fluorine. Specific examples of alkylmagnesium halide include ethylmagnesium chloride, propylmagnesium chloride, butylmagnesium chloride, etc. These magnesium halides may be obtained by reacting magnesium metal with halogenated hydrocarbon or alcohol.

Preferred dialkoxymagnesium or diaryloxymagnesium is the compound represented by the general formula $Mg(OR^7)(OR^8)$ wherein $R^7$ and $R^8$ may be the same or different and each represent a $C_{1-10}$ alkyl group or aryl group. Specific examples of dialkoxymagnesium or diaryloxymagnesium include dimethoxymagnesium, diethoxymagnesium, dipropoxymagnesium, dibutoxymagnesium, diphenoxymagnesium, ethoxymethoxymagnesium, ethoxypropoxymagnesium and butoxyethoxymagnesium, etc. These dialkoxymagnesium or diaryloxymagnesium may be obtained by reacting magnesium metal with alcohol in the presence of a halogen or a halogenated metal compound.

Preferred alkoxymagnesium halide is the compound represented by the general formula $Mg(OR^9)D^2$ wherein $R^9$ represents a $C_{1-10}$ alkyl group and $D^2$ represents a halogen atom such as chlorine, bromine, iodine or fluorine. Specific examples of alkoxymagnesium halide include methoxymagnesium chloride, ethoxymagnesium chloride, propoxymagnesium chloride and butoxymagnesium chloride, etc.

Preferred fatty acid salt of magnesium is the compound represented by the general formula $Mg(R^{10}COO)_2$ wherein $R^{10}$ represents a $C_{1-20}$ hydrocarbon group. Specific examples of the fatty acid salt of magnesium include magnesium laureate, magnesium stearate, magnesium octanoate and magnesium decanoate, etc.

Among these magnesium compounds in the present invention, the dialkoxymagnesium is used preferably. Particularly preferred among these dialkoxymagnesiums is diethoxymagnesium or di-n-propoxymagnesium. The forgoingmagnesium compounds may be used singly or in combination of two or more of them.

The dialkoxymagnesium may be used in granular or powder form to prepare the solid catalyst component (A) in the present invention. The particle shape of the dialkoxymagnesium may be amorphous or spherical. If a spherical particulate dialkoxymagnesium is used, a polymer powder having a better particle shape and a narrower particle size distribution can be obtained. Thus, the polymer powder produced can be easily handled during the polymerization, eliminating troubles such as blocking caused by the fine powder contained in the polymer powder produced.

The foregoing spherical particulate dialkoxymagnesium does not necessarily need to be truly spherical but may be ellipsoidal or pebble-like. In some detail, the shape of the particle is normally not more than 3, preferably from 1 to 2, more preferably from 1 to 1.5 as calculated in terms of the ratio of major axis length 1 to minor axis length w (1/W).

Further, the foregoing dialkoxymagnesium may have an average particle diameter of normally from 1 μm to 200 μm, preferably from 5 μm to 150 μm. The foregoing spherical particulate dialkoxymagnesium has an average particle diameter of normally from 1 μm to 100 μm, preferably from 5 μm to 50 μm, more preferably from 10 μm to 40 μm. Further, referring to its particle size, the foregoing spherical particulate compound preferably has a narrow particle size distribution comprising less fine and coarse powder. In some detail, it is preferred to have the particle size distribution comprising particles having a particle size of not more than 5 μm in an amount of not more than 20%, preferably not more than 10%, and particles having a particle size of at least 100 μm in an amount of not more than 10%, more preferably not more than 5%. The particle size distribution is not more than 3, preferably not more than 2 as calculated in terms of ln (D90/D10) wherein D90 represents the particle diameter at the point where the accumulated particle size reaches 90% and D10 represents the particle diameter at the point where the accumulated particle size reaches 10%.

The process for preparing such spherical particulate dialkoxymagnesium is disclosed in JP-A-58-41832, JP-A-62-51633, JP-A-3-74341, JP-A-4-368391, and JP-A-8-73388.

The titanium compound to be used in the preparation of the solid catalyst component (A) of the present invention is one or more of titanium halide or alkoxytitanium halide represented by the general formula $Ti(OR^{11})_nX_{4-n}$ wherein $R^{11}$ represents a $C_{1-4}$-alkyl group; X represents a halogen atom such as chlorine, bromine and iodine; and n represents 0 or an integer of from 1 to 3.

Specific examples of such a titanium compound include a titanium halide such as titanium tetrahalide including $TiCl_4$, $TiBr_4$ and $TiI_4$, an alkoxytitanium halide such as $Ti(OCH_3)Cl_3$, $Ti(OC_2H_5)Cl_3$, $Ti(OC_3H_7)Cl_3$, $Ti(On-C_4H_9)Cl_3$, $Ti(OCH_3)_2Cl_2$, $Ti(OC_2H_5)_2Cl_2$, $Ti(OC_3H_7)_2Cl_2$, $Ti(On-C_4H_9)_2Cl_2$, $Ti(OCH_3)_3Cl$, $Ti(OC_2H_5)_3Cl$, $Ti(OC_3H_7)_3Cl$, and $Ti(On-C_4H_9)_3Cl$. Preferred among these titanium compounds is titanium tetrahalide. Particularly preferred is $TiCl_4$. These titanium compounds may be used singly or in combination of two or more of them.

The electron donor compound, which can be used in the preparation of the solid catalyst component (A) of the present invention, is an organic compound containing oxygen or nitrogen. For instance, such compounds include alcohols, phenols, ethers, esters, ketones, acid halides, aldehydes, amines, amides, nitriles, isocyanates, and organic silicon compounds containing a Si—O—C bond.

Specific examples of the electron donor compound include alcohols, such as methanol, ethanol, n-propanol, and 2-ethylhexyl alcohol; phenols, such as phenol and cresol; ethers, such as dimethyl ether, diethyl ether, dipropyl ether, dibutyl ether, diamyl ether, and diphenyl ether; monocarboxylic acid esters, such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, methyl anisate, and ethyl anisate; dicarboxylic acid esters, such as diethyl maleate, dibutyl maleate, dimethyl adipate, diethyl adipate, dipropyl adipate, dibutyl adipate, diisodecyl adipate, dioctyl adipate, dimethyl phthalate, diethyl phthalate, dipropyl phthalate, dibutyl phthalate, dipentyl phthalate, dihexyl phthalate, diheptyl phthalate, dioctyl phthalate, dinonyl phthalate, and didecyl phthalate; ketones, such as acetone, methyl ethyl ketone, methyl butyl ketone, acetophenone, and benzophenone; acid halides, such as phthalic acid dichloride and terephthalic acid dichloride; aldehydes, such as acetaldehyde, propionaldehyde, octylaldehyde, and benzaldehyde; amines, such as methylamine, ethyl-amine, tributylamine, piperidine, aniline, and pyridine; amides, such as oleic acid amide and stearic acid amide; nitries, such as acetonitrile, benzonitrile, and tolunitrile; and isocyanates, such as methyl isocyanate, and ethyl isocyanate.

Specific examples of the organic silicon compound containing a Si—O—C bond are phenylalkoxysilane, alkylalkoxysilane, phenylalkylalkoxysilane, cycloalkylalkoxysilane and cycloalkylalkylalkoxysilane.

Among these electron donor compounds preferred are esters, more preferred are aromatic dicarboxylic acid esters with phthalic diesters being particularly preferred. Specific examples of these phthalic diesters include dimethyl phthalate, diethyl phthalate, di-n-propyl phthalate, diisopropyl phthalate, di-n-butyl phthalate, diisobutyl phthalate, ethylmethyl phthalate, methylisopropyl phthalate, ethyl-n-propyl phthalate, ethyl-n-butyl phthalate, di-n-pentyl phthalate, diisopentyl phthalate, dihexyl phthalate, di-n-heptyl phthalate, di-n-octyl phthalate, bis (2,2-dimethylhexyl) phthalate, bis (2-ethylhexyl) phthalate, di-n-nonyl phthalate, diisodecyl phthalate, bis(2,2-dimethylheptyl) phthalate, n-butylisohexyl phthalate, n-butyl(2-ethylhexyl) phthalate, n-pentylhexyl phthalate, n-pentylisohexyl phthalate, isopentylheptyl phthalate, n-pentyl(2-ethylhexyl) phthalate, n-pentylisononyl phthalate, isopentyl(n-decyl) phthalate, n-pentylundecyl phthalate, isopentylisohexyl phthalate, n-hexyl(2-ethylhexyl) phthalate, n-hexylisononyl phthalate, n-hexyl-n-decyl phthalate, n-heptyl(2-ethylhexyl) phthalate, n-heptylisononyl phthalate, n-heptylneodecyl phthalate, and 2-ethylhexylisononylphthalate. These phthalic acid esters may be used either individually or in combination of two or more thereof. Preferably, two or more diesters of phthalic acid may be used. Their combination is preferably such that the difference between the sum of the number of carbon atoms contained in two alkyl groups in one phthalic acid ester and the sum of the number of carbon atoms contained in two alkyl groups in another phthalic acid diester is at least 4.

In the preparation process of the solid catalyst component (A) of this invention, an aluminum compound, a metal salt of an organic acid or a polysiloxane may be used other than the forgoing essential components.

Specific examples of the aluminum compound are aluminum trichloride, diethoxy aluminum chloride, diisopropoxy aluminum chloride, ethoxy aluminum dichloride, isopropoxy aluminum dichloride, buthoxy aluminum dichloride, and triethoxy aluminum.

Specific examples of the metal salt of an organic acid are sodium stearate, magnesium stearate and aluminum stearate.

As polysiloxanes there may be used one or more compounds represented by the following general formula:

In the foregoing general formula, α represents an average polymerization degree of from 2 to 30,000. Most of $R^{12}$ to $R^{19}$ each represents a methyl group. A phenyl group, hydrogen atom, $C_{10-20}$ higher fatty acid residue, epoxy-containing group or $C_{1-10}$ polyoxyalkylene group may substitute some of $R^{12}$ to $R^{19}$. The compound represented by the forgoing general formula may form a cyclic polysiloxane in which $R^{15}$ and $R^{16}$ each are methyl group.

The polysiloxane is known generically as silicone oil. It is a chain, partial hydrogenated, cyclic or denatured polysiloxane having a viscosity of from 2 to 10,000 cSt, preferably from 3 to 500 cSt, at 25° C. which stays liquid or viscous at room temperature.

Specific examples of the polysiloxane are dimethyl polysiloxane and methyl phenyl polysiloxane as a chain polysiloxane, methyl hydrogen polysiloxane of which the rate of hydrogenation is 10 to 80% as a partial hydrogenated polysiloxane, hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane as a cyclic polysiloxane and higher fatty acid-substituted dimethylsiloxane, epoxy-substituted dimethylsiloxane, and polyoxyalkylene-substituted dimethylsiloxane as a denatured polysiloxane.

The above-described solid catalyst component (A) can be prepared by contacting the above-mentioned magnesium compound, titanium compound and electron donor compound.

This contact can proceed in the absence of inert organic solvent but preferably in the presence of inert organic solvent taking into account the ease of operation. Examples of the inert organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons of liquid state at a room temperature having a boiling point of from about 90 to 150° C. are preferred. Specific examples of such aromatic hydrocarbons include toluene, xylene, and ethylbenzene.

Examples of methods for preparing the solid catalyst component (A) include the method for obtaining a solid component by precipitating a solid matter by contacting an electron donor compound or an electron donor compound and a titanium compound, or heat treatment with the solution of the forgoing magnesium compound dissolved in a alcohol or a titanium compound; and the method for obtaining a solid component by contacting and treating the suspension of a magnesium compound in a titanium compound or an inert hydrocarbon solvent with an electron donor compound or an electron donor compound and a titanium compound. Among the above-mentioned methods, the particles of the solid component obtained by the former method is almost spherical and have a narrow particle size distribution. And, in the latter method, by using a spherical magnesium compound, the solid catalyst component having a spherical particle and narrow particle size distribution can be obtained. Moreover, the solid component having a spherical particle and narrow particle size distribution can be also obtained, for example, by forming a particle by so called a "spray-drying method" in which a solution or a suspension is sprayed and dried by using a spraying apparatus.

The contact for each component is conducted under an atmosphere of an inert gas and a condition of eliminating water, etc. with stirring in a vessel with agitator. The temperature for contacting can be set up at relatively low temperature range of around room temperature in the case of simply mixing with stirring after contacting or conducting a denatured treatment by dispersing or suspending. However, in the case of obtaining a product by reacting after contacting, the temperature for contacting is preferably at the temperature range from 40 to 130° C. If the temperature at reaction is less than 40° C., such reaction is not proceeded completely and the efficiency of the resulting solid component becomes insufficient. If the temperature of the reaction exceeds 130° C., the reaction is hard to control because the solvent used in reaction vaporizes extremely. The time for reaction is usually 1 minute or more, preferably 10 minutes or more, more preferably, 30 minutes or more.

Typical methods for preparing solid catalyst component (A) are described below:

(1) Anhydrous magnesium chloride and 2-ethylhexyl alcohol are reacted to form a uniform solution, which is then brought into contact with phthalic anhydride. The resulting solution is then brought into contact with titanium tetrachloride and diester of phthalic acid to obtain a solid product, which is further brought into contact with titanium tetrachloride to prepare solid catalyst component (A).

(2) Metallic magnesium, butyl chloride, and dibutyl ether are allowed to react to synthesize an organomagnesium compound. The organo-magnesium compound is brought into contact with tetrabutoxy-titanium and tetraethoxysilane to obtain a solid product, which is then brought into contact with a diester of phthalic acid, dibutyl ether, and titanium tetrachloride to prepare solid catalyst component (A). The resulting solid component may be preliminarily treated with an organic aluminum compound, an organosilicon compound, and an olefin.

(3) An organomagnesium compound, e.g., dibutylmagnesium, and an organic aluminum compound are brought into contact with an alcohol, e.g., butanol or 2-ethylhexyl alcohol, in the presence of an inert organic solvent to form a uniform solution. The resulting solution is brought into contact with a silicon compound, e.g., $SiCl_4$, $HSiCl_3$ or polysiloxane, to obtain a solid product. The solid product is brought into contact with titanium tetrachloride and a diester of phthalic acid in the presence of an aromatic hydrocarbon solvent, and the reaction mixture is further brought into contact with titanium tetrachloride to obtain solid catalyst component (A).

(4) Magnesium chloride, a tetraalkoxytitanium, and an aliphatic alcohol are brought into contact in the presence of a saturated hydrocarbon to form a uniform solution. Titanium tetrachloride is then added to the solution, and the mixture is heated to precipitate a solid product. The solid product is brought into contact with a diester of phthalic acid and further is reacted with titanium tetrachloride to prepare solid catalyst component (A).

(5) Metallic magnesium powder, an alkyl monohalide, and iodine are contacted. The resulting reaction product, a tetraalkoxytitanium, an acid halide, and an aliphatic alcohol are contacted in the presence of a saturated hydrocarbon to form a uniform solution. Titanium tetrachloride is added to the solution, and the mixture is heated to precipitate a solid product. The solid product is brought into contact with a diester of phthalic acid and further reacted with titanium tetrachloride to prepare solid catalyst component (A).

(6) Diethoxymagnesium is suspended in an aromatic hydrocarbon or a halogenated hydrocarbon solvent, and the resulting suspension is brought into contact with titanium tetrachloride. The mixture is heated and then contacted with a diester of phthalic acid to obtain a solid product. The solid product is washed with an aromatic hydrocarbon and again contacted with titanium tetrachloride in the presence of the aromatic hydrocarbon to prepare solid catalyst component (A). The resulting solid catalyst component may be subjected to a heat treatment in the presence or absence of an inert organic solvent.

(7) Diethoxymagnesium, calcium chloride, and a silicon compound represented by Si $(OR^{20})_4$ (wherein $R^{20}$ is an alkyl group or an aryl group) are co-ground, and the resulting grinds are suspended in an aromatic hydrocarbon. The suspension is brought into contact with titanium tetrachloride and an diester of aromatic dicarboxylic acid, and the product is further contacted with titanium tetrachloride to prepare solid catalyst component (A).

(8) Diethoxymagnesium and a diester of phthalic acid are suspended in an aromatic hydrocarbon, and the suspension is added to titanium tetrachloride to obtain a solid product. The solid product is washed with an aromatic hydrocarbon, and further contacted with titanium tetrachloride in the presence of the aromatic hydrocarbon to prepare solid catalyst component (A)

(9) A calcium halide and a fatty acid salt of magnesium, e.g., magnesium stearate, are contacted and reacted with titanium tetrachloride and an aromatic dicarboxylic acid diester, and the reaction product is further brought into contact with titanium tetrachloride to prepare solid catalyst component (A).

(10) Diethoxymagnesium is suspended in an aromatic hydrocarbon or a halogenated hydrocarbon solvent, and the resulting suspension is brought into contact with titanium tetrachloride, and the mixture is heated and contacted with a diester of phthalic acid to obtain a solid product. The resulting solid product is washed with an aromatic hydrocarbon and further contacted with titanium tetrachloride in the presence of the aromatic hydrocarbon to prepare solid catalyst component (A). At any stage of the above preparation procedure, the system is brought into contact with aluminum chloride.

(11) Diethoxymagnesium is suspended in an aromatic hydrocarbon or a halogenated hydrocarbon solvent, and the resulting suspension is brought into contact with titanium tetrachloride, and the mixture is heated and contacted with two or more diesters of phthalic acid different in the carbon atom number of the alkyl moiety to obtain a solid product. The resulting solid product is washed with an aromatic hydrocarbon and further contacted with titanium tetrachloride in the presence of the aromatic hydrocarbon to prepare solid catalyst component (A). In the above preparation, when the solid product is brought into contact with the second titanium tetrachloride, it may again contacted with two or more diesters of phthalic acid different in the carbon atom number of the alkyl group. And also, the above-mentioned electron donor compound other than the diesters of phthalic acid can be used with the diesters of phthalic acid.

(12) Diethoxymagnesium, 2-ethylhexylalcohol and carbon dioxide are contacted and reacted with each other in the presence of toluene to prepare a homogeneous solution, and the solution is further brought into contact with titanium tetrachloride and a diester of phthalic acid to obtain a solid product, and further the solid product is dissolved in tetrahydrofulan to precipitate a solid product. The solid product precipitated is brought into contact with titanium tetrachloride and, if necessary, repeated the contact with titanium tetrachloride to prepare solid catalyst component (A). The silicon compound such as tetrabutoxysilane may be used in any step of the forgoing contacting, reacting or dissolving step.

(13) Magnesium dichloride, an organic epoxy compound and a phosphoric acid compound are suspended in a hydrocarbon solvent such as toluene and heated to prepare a homogeneous solution. Phthalic anhydride and titanium tetrachloride are contacted and reacted with the solution to obtain a solid product and a diester of phthalic acid is reacted with the solid product. The resulting reaction product is washed with an aromatic hydrocarbon and contacted again with titanium tetrachloride in the presence of the aromatic hydrocarbon to prepare solid catalyst component (A).

(14) A dialkoxy magnesium, a titanium compound and a diester of an aromatic dicarboxylic acid are contacted and reacted each other in the presence of a hydrocarbon (liquid at room temperature) to obtain a solid product, and a silicon compound such as a polysiloxane is contacted and reacted with the reaction product, and further contacted and reacted with titanium tetrachloride. The solid product is contacted and reacted with a metal salt of an organic acid and contacted again with titanium tetrachloride to prepare solid catalyst component (A).

As described above, there are some methods for preparation of solid catalyst component (A). However, it is essential for the solid catalyst component (A) to satisfy the relation represented by the formula (1), which shows a parameter obtained by Raman spectroscopy analysis, in order to attain the improvement of hydrogen response as the subject matter of the present invention.

Figure 1:
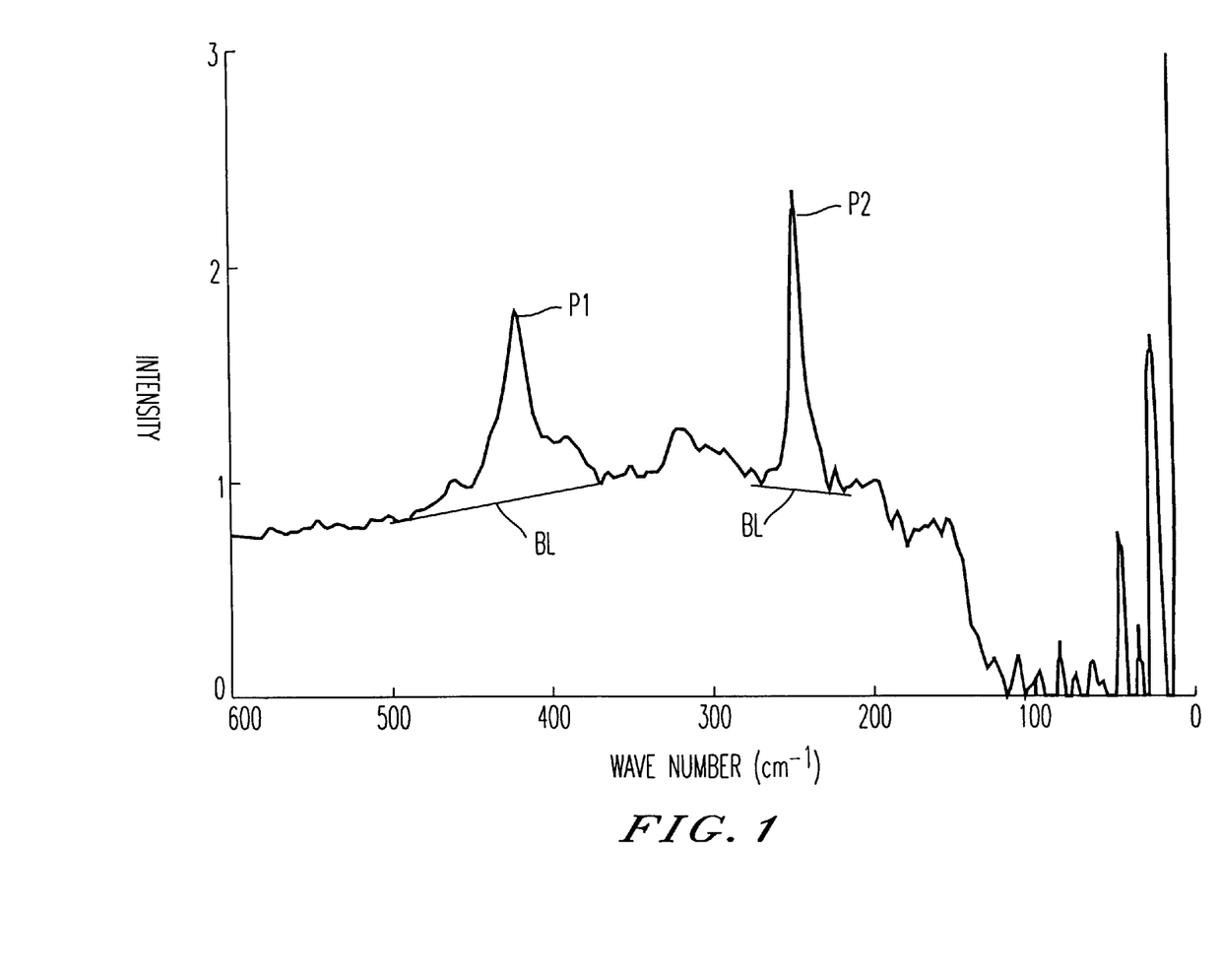
FIG. 1 shows an example of Raman spectrum of a solid catalyst component of the present invention.

As shown in FIG. 1, when a solid catalyst component containing Mg, Ti, an electron donor compound and a halogen atom is analyzed with Raman spectroscopy, some peaks are normally appeared in the spectrum. In the peaks, a sharp and strong peak (P2) appeared in the wave number between 160 and 340 $cm^{-1}$ is the peak caused by magnesium dichloride. It can be confirmed from the fact that a sharp peak having its top at around 240 cm $cm^{-1}$ is observed when magnesium chloride itself is analyzed. Because the structure of the component of magnesium dichloride in a solid catalyst component is not much affected by the other components contained in a solid catalyst component, shift the wave number appeared P2 is not observed very much.

On the other hand, the strongest peak (P1) appeared in the wave number between 360 and 520 $cm^{-1}$ is the peak caused by and brought about the component containing a titanium compound. Specifically, it is found that the peak is caused by and brought about a complex of titanium tetrachloride and magnesium chloride, titanium tetrachloride and a complex of an electron donor compound and magnesium chloride. To improve hydrogen response, it is needed that hydrogen is adsorbed or adsorbed and dissociated efficiency on a solid catalyst component. The complex containing titanium described above acts a suitable site for the adsorption and dissociation. Because P1 is the peak caused by a complex containing titanium described above, the shape of P1 is broader comparing with the shape of P2, and the position appeared P1 (the wave number) may be changed depending on the difference of the preparation process for the solid catalyst component. For instance, in the Raman spectrum shown in FIG. 1, P1 is appeared as a peak having the top at around 420 $cm^{-1}$. However, in a solid catalyst component, which has having the stronger interaction of titanium tetrachloride and an electron donor compound, P1 is shifted to the lower wave number side.

The value of S1/S2, which represents a ratio of peak area of P1 and P2, is an index related with a ratio of magnesium chloride acted as catalyst carrier to a complex containing titanium acted as a site for which hydrogen can be adsorbed or adsorbed and dissociated effectively. The hydrogen response can be improved by using a solid catalyst component, which S1/S2 is in the specific range, for polymerization of olefins. Although P1 is the strongest peak appeared between 360 and 520 $cm^{-1}$, because P1 is the peak caused by the several titanium complexes as described above, S1 means the peak area including all peaks in the case that a shoulder peak adding to the strongest peak is appeared or the strongest peak is separated to two peaks.

The solid catalyst component of the present invention satisfies the relation of $0.5 \leq S1/S2 \leq 10$, preferably, $0.7 \leq S1/S2 \leq 8$, more preferably $0.9 \leq S1/S2 \leq 5$. The solid catalyst component brings about a remarkable effect for improving hydrogen response while maintaining a high yield and a high stereoregularity of polymer.

In the measurement of Raman spectrum, the apparatus to be used is not specifically limited as far as it has an appropriate ability, and for instance, a measuring instrument of Raman spectrum on the market can be used. The number of times for integration is optional, but, preferably 50 to 50,000 allowing for a relation of the precision of the measurement and the contamination of the sample. As illustrated in FIG. 1, the area values (S1 and S2) of the aforementioned strongest peak P1 and P2 is the area of the above part jutted out from the base line (BL) of the Raman spectrum. The value of area can be determined by the known methods, e.g., can be determined by the calculation with a computer or the method of an approximate triangular calculation.

There are several methods for optimizing the value of S1/S2, namely, for optimizing the volume of a complex containing titanium remained in the solid catalyst component.

(1) An appropriate electron donor compound is used. Specific examples of the electron donor includes a diester of an aromatic dicarboxylic acid, preferably, a diester of phthalic acid having a $C_{6-12}$-alkyl group, more preferably, one or more of a diester of phthalic acid having a $C_{7-10}$-alkyl group. The diester of phthalic acid is the most preferable compound for managing to hydrogen response and the other efficiency at the same time.

(2) The volume of an electron donor compound to be added is optimized. Specifically, An electron donor compound is added in the preparation of the solid catalyst component such that the total content of the electron donor compound in the solid catalyst component (A) is 10 to 30 weight %, preferably 10 to 25 weight %, more preferably 15 to 25 weight %. If the content is outside of the range, the efficiency other than hydrogen response, e.g., a catalyst activity and a yield of a stereoregular polymer deteriorates.

(3) The point for adding an electron donor compound in the preparation of a solid catalyst component is optimized. This is for preventing a changing in quality or a outflow of a complex containing titanium by the following treatment and washing. Specifically, an electron donor compound is added at the time of mixing a magnesium compound and a titanium compound by contacting for each other or at the latter half of a temperature rise before the treatment with a titanium compound (in the case if a multi-step treatment, the treatment with a titanium compound is a first half of the step) as the content is fixed within the range described in (2) above. Preferably, an electron donor compound is added after the intermediate washing, during the treatment with a titanium compound (in the case of a multi-step treatment, the treatment is the latter half of the treatment) or just before the final washing. In the case an electron donor compound is added separately or two or more kinds of an electron donor compound are used, one of the additions of the electron donor compound may be conducted at the points described above.

(4) The temperature and the time of the treatment with a titanium compound are optimized. Specifically, such temperature is 0 to 130° C., preferably 40 to 100° C., more preferably 50 to 90° C., and such time is 0.5 to 6 hours, preferably 0.5 to 5 hours, more preferably 1 to 4 hours. These are for preventing the change in quality of a complex containing titanium during the treatment.

(5) The times of the treatment with a titanium compound is optimized in the case if a multi-step treatment with a titanium compound. Specifically, The treatment with a titanium compound is conducted 1 to 10 times, preferably 2 to 7 times, more preferably 2 to 4 times. If the times are outside the range, the efficiency other than hydrogen response, e.g., a catalyst activity and a stereoregularity of polymer, deteriorates.

(6) In the case that a solid catalyst component is washed intermediately with an aromatic hydrocarbon compound, such washing is conducted at lower temperature or in fewer times. These are for preventing the outflow of a complex containing titanium from a solid catalyst component. Specifically, the temperature is 0 to 100° C., preferably 30 to 100° C., more preferably 50 to 90° C., and the times is 1 to 10 times, preferably 1 to 8 times, more preferably 1 to 5 times.

In the methods described above, (1) and (2) are preferable methods, and (3) to (6) are the specific means to achieve (2). The foregoing methods may be adopted singly or combined with one or more method.

According to the above, the following method may be given as the preferable example for the method of preparation of solid catalyst component (A) of the present invention: A dialkoxymagnesium is suspended in an aromatic hydrocarbon compound, which is liquid state at a room temperature. A titanium compound is brought into contact with the suspended liquid (low temperature reaction), and conducted a reaction (the first treatment). In the foregoing step, before or after a titanium compound is brought into contact with the suspension, one or more of a diester of an aromatic dicarboxylic acid is added at −20 to 130° C. to obtain a solid reaction product. The solid reaction product is washed with an aromatic hydrocarbon compound of liquid at a room temperature (intermediate washing), and then a titanium compound is brought into contact and reacted with the solid reaction product again in the presence of an aromatic hydrocarbon compound (second treatment). It is a preferable embodiment that one or more of a diester of an aromatic dicarboxylic acid is brought into contact with the solid reaction product before or after a titanium compound is brought into contact with the solid reaction product. Next, the solid reaction product is washed with an inert organic solvent of a liquid state at a room temperature (final washing) to obtain solid catalyst component (A).

The foregoing treatment and washing in the present invention may be conduct in the conditions described above. More specific conditions are as follows:

(1) The low temperature reaction is not limited specifically, but conducted at −20 to 100° C., preferably −10 to 70° C., and more preferably 0 to 30° C. for 1 minute to 6 hours, preferably 5 minutes to 4 hours, more preferably 10 minutes to 3 hours.

(2) The first treatment is conducted at 0 to 130° C., preferably 40 to 100° C., more preferably 50 to 90° C. for 0.5 to 6 hours, preferably 0.5 to 5 hours, more preferably 1 to 4 hours.

(3) The intermediate washing is conducted at 0 to 110° C., preferably 30 to 100° C., more preferably 50 to 90° C. one to ten times, preferably one to eight times, more preferably one to five times.

(4) The second treatment is conducted at 0 to 130° C., preferably 40 to 100° C., more preferably 50 to 90° C. for 0.5 to 6 hours, preferably 0.5 to 5 hours, more preferably 1 to 4 hours.

(5) The final washing is not limited specifically, but conducted at 0 to 110° C., preferably 30 to 100° C., more preferably 30 to 60° C. one to fifteen times, preferably two to ten times, more preferably three to eight times.

At the time of contacting and mixing a dialkoxymagnesium and an aromatic hydrocarbon compound, the time of contacting and mixing a dialkoxymagnesium and a titanium compound, and at the time of later half of a temperature rise before the first treatment, a large portion of an electron donor compound such as a diester of an aromatic dicarboxylic acid is added so as to be within the volume of content described above. Two or more of an electron donor compound are used or one kind of an electron donor compound is added in installment, and the addition (in the case that two or more of an electron donor compound are used, at least one of them) is conducted at the intermediate washing, during the second treatment or just before the final washing.

The proportion of amount of each compound to be used for preparing solid catalyst component (A) is not specifically limited because it is differed-depending on the preparation method. Specific examples of the proportion of a titanium compound is from 0.5 to 100 mols, preferably from 0.5 to 50 mols, more preferably from 1 to 10 mols per mol of a magnesium compound. The proportion of an electron donor compound is from 0.01 to 10 mols, preferably from 0.01 to 1 mol, more preferably from 0.02 to 0.6 mol per mol of a magnesium compound.

The preferable content of solid catalyst component (A) is from 10 to 70% by weight, preferably 10 to 50% by weight, more preferably 15 to 40% by weight as magnesium atom, from 20 to 90% by weight, preferably 30 to 85% by weight, more preferably 40 to 80% by weight as halogen atom, from 2.0 to 10% by weight, preferably 2.3 to 5.0% by weight, more preferably 2.3 to 4% by weight as titanium atom, and from 10 to 30% by weight, preferably 10 to 25% by weight, more preferably 15 to 25% by weight as an electron donor compound.

As the organic aluminum compound (B) to be used with the solid catalyst component (A) mentioned above to form a catalyst for polymerization of olefins of the present invention, there may be used one represented by the general formula: $R^1_p AlQ_{3-p}$ (in which $R^1$ represents a $C_{1-4}$-alkyl group; Q represents a hydrogen atom or a halogen atom; and p represents a real number of more than 0 to not more than 3). Specific examples of the organic aluminum compound (B) include triethylaluminum, diethylaluminum chloride, tri-iso-butyl-aluminum, diethylaluminum bromide, and diethylaluminum hydride. These organic aluminum compounds may be used singly or in combination of two or more of them. Preferred among these organic aluminum compounds are triethylaluminum,-and tri-iso-butylaluminum.

As the organic silicon compound (C) to be used in the present invention there may be used a compound represented by the general formula $R^2_q Si(OR^3)_{4-q}$, (in which $R^2$ may be the same or different and represents a $C_{1-12}$-alkyl, cycloalkyl, phenyl, vinyl, allyl or aralkyl group; $R^3$ may be the same or different and represents a $C_{1-4}$-alkyl, cycloalkyl, phenyl, vinyl, allyl or aralkyl group; and q represents 0 or an integer of from 1 to 3). Specific examples of the organic silicon compound (C) include phenylalkoxysilane, alkylalkoxysilane, phenylalkylalkoxysilane, cycloalkylalkoxysilane and cycloalkylalkylalkoxysilane.

Specific examples of the foregoing organic silicon compound include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, cyclohexyldimethylmethoxysilane, cyclohexyldiethylmethoxysilane, cyclohexyldiethylethoxysilane, dimethyldimethoxysilane, dimrethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, bis(3-methylcyclohexyl)dimethoxysilane, bis-(4-methylcyclohexyl)dimethoxysilane, bis(3,5-dimethylcyclohexyl)dimethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyl-dimethoxysilane, 3,5-dimethylcyclohexylcyclopentyldimethoxysilane, 3-methylcyclohexylcyclohexyldimethoxysilane, 4-methylcyclohexylcyclohexyldimethoxysilane, 3,5-dimethylcyclohexylcyclohexyldimethoxysilane, cyclohexylmethyldimethoxysilane, cyclohexylmethyldiethoxysilane, cyclohexylethyldimethoxysilane, cyclohexyl(iso-propyl) dimethoxysilane, cyclohexylethyldiethoxysilane, cyclopentylmethyldimethoxysilane, cyclopentylmethyldiethoxysilane, cyclopentylethyldiethoxysilane, cyclopentyl(iso-propyl) dimethoxysilane, cyclohexyl (n-pentyl) dimethoxysilane, cyclohexyl(n-pentyl)diethoxysilane, cyclopentyl(iso-butyl) dimethoxysilane, cyclohexyl(n-propyl)dimethoxysilane, cyclohexyl(n-propyl)diethoxysilane, cyclohexyl(n-butyl) diethoxysilane, cyclohexyl(iso-butyl)dimethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, 2-ethylhexyltrimethoxysilane, 2-ethylhexyltriethoxysilane, cyclohexyltrimnethoxysilane, cyclohexyltriethoxysilane, cyclopentyltrimethoxysilane, cyclopentyltriethoxysilane, vinyltrimethoxysilane, vinyltriethoxysilane, phenyltrimethoxysilane, phenyltriethoxysilane, tetramethoxysilane, tetraethoxysilane, tetrapropoxysilane and tetrabutoxysilane: Preferred among these organic silicon compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilene, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilene, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilan, 4-methylcyclohexylcyclopentyldimethoxysilane, and 3,5-dimethylcyclopentyldimethoxysilane. These organic silicon compounds (C) may be used singly or in combination of two or more of them.

In the polymerization process of the present invention, the polymerization of olefins is accomplished by the polymerization or copolymerization of olefins in the presence of a catalyst made of the foregoing solid catalyst component (A), organic aluminum compound (B) and organic silicon compound (C). The ratio of the various components to be used is arbitrary and not specifically limited unless the effects of the present invention are impaired. In general, the proportion of the organic aluminum compound (B) is from 1 to 1,000 mols, preferably from 50 to 800 mols per mol of titanium atom in the solid catalyst component (A). The proportion of the organic silicon compound (C) is from 0.002 to 10 mols, preferably from 0.01 to 2 mols, more preferably from 0.01 to 0.5 mol per mol of the component (B).

The order of contact of each component is arbitrary. Preferably, organic aluminum compound (B) is charged first into a polymerization system, and then brought into contact with organic silicon compound (C), and further contact with solid catalyst component (A).

The process for polymerization of the present invention may be carried out in the presence or absence of an organic solvent. The olefin monomer to-be polymerized may be used in either a gaseous state or a liquid state. The polymerization temperature is not higher than 200° C., preferably not higher than 100° C. The polymerization pressure is not higher than 10 MPa, preferably not higher than 5 MPa. The continuous polymerization process or batchwise polymerization process may be applied. Further, the polymerization reaction may be carried out in one step or two or more steps.

The olefins to be homopolymerized or copolymerized by the process of the present invention include ethylene, propylene, 1-butene, 1-pentene, 4-methyl-1-pentene and vinylcyclohexane. These olefins may be used singly or in combination of two or more of them. Among these olefins, ethylene and propylene are preferably used.

The polymerization (hereinafter referred as "main polymerization") of olefins in the presence of the catalyst made of the foregoing solid catalyst component (A), organic aluminum compound (B) and organic silicon compound (C) in the present invention is preferably preceded by prepolymerization to further enhance the catalytic activity and the stereoregularity, particle properties of the polymer thus produced and the like. As the monomers to be used in the prepolymerization there may be used the same olefins as main polymerization as well as monomers such as styrene.

In the prepolymerization, the order of contact for each component and monomer is arbitrary. Preferably, the organic aluminum compound (B) is charged into the prepolymerization system set up to the atmosphere of inert gas or olefin gas to be polymerized, and after contacting with the solid catalyst component (A), brought into contact with one or more olefins. In the case of conducting prepolymerization on combination with the organic silicon compound (C), preferably, the organic aluminum compound (B) is charged into the prepolymerization system set up to the atmosphere of inert gas or olefin gas to be polymerized, and after contacting with the organic silicon compound (C) and further the solid catalyst component (A), and then brought into contact with one or more olefins.

In case that the polymerization of olefins is carried out in the presence of the catalyst for polymerization of olefins formed by the invention, the melting flow (MI) of polymer produced with the same volume of hydrogen increase 60% in maximum in comparison with the case of using a conventional catalyst, and also regarding catalyst activity and a stereoregularity of the polymer produced, the catalyst of the invention shows the same or better level of efficiency in comparison with a conventional catalyst. Namely, it was confirmed that hydrogen response can be made a great improvement with maintaining a activity and a stereoregularity of polymer in a high level.

The present invention will be further described in the following examples as compared with the comparative examples.

<Measurement of the solid catalyst component by Raman spectroscopic analysis and calculation of a parameter>

Preparation of a sample for measurement: In nitrogen atmosphere, grease was slathered on a slide glass annularly. On the center of the annular slathered grease, about 100 mg of the solid catalyst component was placed, and another slide glass was covered on the top surface. By preparing as the above manner, the solid catalyst component itself was not contacted with air if such sample is exposed to air and the condition of nitrogen atmosphere can be kept.

Measurement: The measurement sample prepared as described above was measured by Raman spectroscopic photometer made by JEOL Ltd. (the instrument of Fourier transformation infrared spectroscopic photometer JIR-7000 combined with Raman spectroscopic unit JRS-7000S). In the measurement, YAG laser oscillating wave length was 1,064 nm, scope of measurement was 0 to 4,000 $cm^{-1}$, resolving power was 4 $cm^{-1}$, integrating number was 300 times, amp gain was 2 times, wave length interval of data point was 2 $cm^{-1}$, scanning speed was 0.6 mm/sec. The part for holding a sample was in the atmosphere of air. After the measurement, a value of area S1 for the strongest peak P1 appeared in the waves between 360 and 520 $cm^{-1}$ and a value of area S2 for the strongest peak P2 appeared in the waves between 160 and 340 $cm^{-1}$ were calculated and the ratio of both value S1/S2 was calculated. More specifically, as shown in FIG. 1, a base line (BL) for P1 and P2 were drawn, and S1/S2 was determined by calculating the area jutted out from the upper of the base lines with a computer.

<Evaluation of Polymerization>

The evaluation of polymerization was conducted by using the catalyst for polymerization of olefins of the present invention, and a polymerization activity per g of solid catalyst component (Yield) and an amount of polymer undissolved when the polymer was extracted with boiling n-heptane for 6 hours (HI) by the high-temperature type Soxhlet's extractor were measured. The following equation (4) and (5) determined the polymerization activity and HI. Further, melt flow rate of the polymer produced (MI), bulk density (BD) were measured. The measurement methods of MI and BD were conducted in accordance with JIS K 7210 and JIS K 6721 respectively.

$$\text{Yield}(g\text{-}pp/g\text{-}cat.)=a(g)/\text{solid catalyst component }(g) \quad (4)$$

$$HI(\text{wt \%})=\{b(g)/a(g)\}\times 100 \quad (5)$$

In the equations (4) and (5) above, a shows a weight of polymer produced after termination of polymerization reaction, b shows a weight of n-heptane undissolved polymer when polymer was extracted with boiling n-heptane for 6 hours.

EXAMPLE 1

<Preparation of solid catalyst component>

Into a 2000-ml round flask equipped with an agitator in which had been thoroughly replaced by nitrogen gas were charged 150 g of diethoxymagnesium, 750 ml of toluene and 54 ml of bis (2-ethylhexyl)phthalate to make a suspension. The all amount of the suspension was then added at 5° C. to a solution of 450 ml of toluene and 300 ml of titanium tetrachloride pre-charged into a 3000-ml round flask equipped with an agitator in which the air within had been thoroughly replaced by nitrogen gas. The foregoing mixed solution was agitated for one hour maintaining the temperature of 5° C. (low temperature reaction) and to the solution was then added 30 ml of di-n-butyl phthalate. The temperature of the reaction system was raised to 80° C. and where the suspension was then reacted for 2 hours with stirring (first treatment). After the termination of the reaction, the resulting solid reaction product was then washed with 80° C. of toluene four times (intermediate washing). Thereafter, to the resulting solid reaction product were added 1200 ml of toluene and 300 ml of titanium tetrachloride. The mixture was then reacted with stirring maintaining a temperature of 80° C. for 2 hours (second treatment). Thereafter, the resulting solid reaction product was washed with 40° C. of n-heptane seven times (final washing), separated by filtration and dried to obtain a powdered solid catalyst component. The solid catalyst component was then measured for Ti content. The result was 2.63% by weight. Further, the solid catalyst component was measured for whole content of a diester of an aromatic dicarboxylic acid. The result was 16.6% by weight. S1/S2 was determined by measuring the solid catalyst component by Raman spectroscopic analysis. The results are set forth in Table 1.

<Preparation of polymerization catalyst and polymerization>

Into a 2200 ml autoclave equipped with an agitator in which the air within had been completely replaced by nitrogen gas were charged the foregoing solid catalyst component in an amount of 0.0026 mmol as calculated in terms of titanium atom, 1.3 mmol of triethylaluminum and 0.13 mmol of cyclohexylmethyldimethoxysilane to form a polymerization catalyst. Into the autoclave were then charged 2000 ml of hydrogen gas and 1400 ml of liquid propylene. The mixture was allowed to undergo prepolymerization at a temperature of 20° C. for 5 minutes and was then allowed to main polymerization at a temperature of 70° C. for 1 hour. The results of the evaluation of polymerization are set forth in Table 1.

EXAMPLE 2

The procedure of Example 1 was followed to effect the preparation of a solid catalyst component, the measurement of the solid catalyst component by Raman spectroscopic analysis, the polymerization and the evaluation of the resulting polymer thereof except that the first treatment and the second treatment were conducted at 90° C. Ti content of the resulting solid catalyst component was 2.47% by weight and the whole content of a diester of an aromatic dicarboxylic acid in the solid catalyst component was 15.5% by weight. The results of the measurement by Raman spectroscopy and the evaluation of polymerization are set forth in Table 1.

EXAMPLE 3

<Preparation of solid catalyst component>

Into a 2000-ml round flask equipped with an agitator in which the air within had been thoroughly replaced by nitrogen gas were charged 150 g of diethoxymagnesium and 750 ml of toluene to make a suspension. The all amount of the suspension was then added at 5° C. to a solution of 450 ml of toluene and 300 ml of titanium tetrachloride precharged into a 3000-ml round flask equipped with an agitator in which the air within had been thoroughly replaced by nitrogen gas. The foregoing mixed solution was agitated for one hour with maintaining the temperature of 5° C. (low temperature reaction) and to the solution was then added 54 ml of bis (2-ethylhexyl)phthalate (first donor). The temperature of the reaction system was raised to 105° C. and where the suspension was then reacted for 2 hours with stirring (first treatment). After the termination of the reaction, the resulting solid reaction product was then washed with 100° C. of toluene four times (intermediate washing). Thereafter, to the resulting solid reaction product were added 1200 ml of toluene and 300 ml of titanium tetrachloride. The temperature of the mixture was raised to 100° C. On the way of such heating, 30 ml of di-n-butylphthalate (second donor) was added thereto at 80° C. After the temperature of the mixture was reached to 100° C., the mixture was reacted with stirring at a temperature of 100° C. for 2 hours (second treatment). Thereafter, the resulting solid reaction product was washed with 40° C. of n-heptane seven times (final washing), separated by filtration and dried to obtain a powdered solid catalyst component. The solid catalyst component was then measured for Ti content. The result was 3.18% by weight. Further, the solid catalyst component was measured for whole content of a diester of an aromatic dicarboxylic acid. The result was 20.0% by weight. S1/S2 was determined by measuring the solid catalyst component by Raman spectroscopic analysis. The results are set forth in Table 1. The procedure of Example 1 was followed to effect the polymerization except that the solid catalyst component prepared as described above was used. The results of the evaluation of polymerization are set forth in Table 1.

EXAMPLE 4

The procedure of Example 3 was followed to effect the preparation of a solid component, the measurement of the solid catalyst component by Raman spectroscopic analysis, the polymerization and the evaluation of the resulting polymer thereof except that the di-n-propylphthalate was used as the second donor. The chart for Raman spectrum of the resulting solid catalyst component is shown in FIG. 1. Ti content of the resulting solid catalyst component was 3.81% by weight and the whole content of a diester of an aromatic dicarboxylic acid in the solid catalyst component was 20.0% by weight. The results of the measurement by Raman spectroscopy and the evaluation of polymerization are set forth in Table 1.

EXAMPLE 5

The procedure of Example 3 was followed to effect the preparation of a solid component, the evaluation of the solid catalyst component by Raman spectroscopic analysis, the polymerization and the evaluation of the resulting polymer thereof except that the di-n-propylphthalate was used as the first donor and bis(2-ethylhexyl)phthalate was used as the second donor. Ti content of the resulting solid catalyst component was 2.71% by weight and the whole content of a diester of an aromatic dicarboxylic acid in the solid catalyst component was 21.1% by weight. The results of the measurement by Raman spectroscopy and the evaluation of polymerization are set forth in Table 1.

COMPARATIVE EXAMPLE 1

<Preparation of solid catalyst component>

Into a 2000-ml round flask equipped with an agitator in which the air within had been thoroughly replaced by nitrogen gas were charged 150 g of diethoxymagnesium and 750 ml of toluene to make a suspension. The all amount of the suspension was then added at 5° C. to a solution of 450 ml of toluene and 300 ml of titanium tetrachloride precharged into a 3000-ml round flask equipped with an agitator in which the air within had been thoroughly replaced by nitrogen gas. The foregoing mixed solution was agitated for one hour with maintaining the temperature of 5° C. and to the solution was then added 54 ml of di-n-butylphthalate. The mixture was heated to 105° C. On the way of such heating, 60 ml of dimethylpolysiloxane was added thereto. After the termination of such heating, the mixture was reacted for two hours with stirring. After the termination of the reaction, the resulting solid reaction product was then washed with 100° C. of toluene. Thereafter, to the resulting solid reaction product were added 1200 ml of toluene and 300 ml of titanium tetrachloride. The temperature of the mixture was raised to 100° C. and the mixture was reacted with for 2 hours. Thereafter, the resulting solid reaction product was washed with 40° C. of n-heptane, separated by filtration and dried to obtain a powdered solid catalyst component. The solid catalyst component was then measured for Ti content. The result was 1.37% by weight. Further, the solid catalyst component was measured for whole content of a diester of an aromatic dicarboxylic acid. The result was 12.61% by weight. S1/S2 was determined by measuring the solid catalyst component by Raman spectroscopic analysis. The results are set forth in Table 1. The procedure of Example 1 was followed to effect the polymerization except that the solid catalyst component prepared as described above was used. The results of the evaluation of polymerization are set forth in Table 1.

COMPARATIVE EXAMPLE 2

<Preparation of solid catalyst component>

Into a 2000-ml round flask equipped with an agitator in which the air within had been thoroughly replaced by nitrogen gas were charged 100 g of diethoxymagnesium and 500 ml of toluene to make a suspension. The all amount of the suspension was then added at 5° C. to a solution of 200 ml of toluene and 300 ml of titanium tetrachloride precharged into a 2000-ml round flask equipped with an agitator in which the air within had been thoroughly replaced by nitrogen gas. To the solution was then added 18 ml of bis(2-ethylhexyl)phthalate and 54 ml of di-n-butylphthalate. The mixture was heated to 100° C. On the way of such heating, 7 ml of diethylphthalate and 30 ml of dimethylpolysiloxane were added thereto. After the termination of such heating, the mixture was reacted for two hours with stirring. After the termination of the reaction, the resulting solid reaction product was then washed with 80° C. of toluene. Thereafter, to the resulting solid reaction product were added 700 ml of toluene and 300 ml of titanium tetrachloride. The temperature of the mixture was raised to 115° C. and the mixture was reacted with for 2 hours. Thereafter, the resulting solid reaction product was washed with 40° C. of n-heptane, separated by filtration and dried to obtain a powdered solid catalyst component. The solid catalyst component was then measured for Ti content. The result was 2.17% by weight. Further, the solid catalyst component was measured for whole content of a diester of an aromatic dicarboxylic acid. The result was 13.12% by weight. S1/S2 was determined by measuring the solid catalyst component by Raman spectroscopic analysis. The results are set forth in Table 1. The procedure of Example 1 was followed to effect the polymerization except that the solid catalyst component prepared as described above was used. The results of the evaluation of polymerization are set forth in Table 1.

TABLE 1

|  | Parameter obtained by Raman spectroscopic analysis S1/S2 | Yield g-PP/g-cat. | HI wt. % | BD g/ml | MI g/10 min |
|---|---|---|---|---|---|
| Example 1 | 0.94 | 56,300 | 98.9 | 0.47 | 9.0 |
| Example 2 | 0.99 | 74,200 | 98.8 | 0.44 | 8.8 |
| Example 3 | 1.15 | 56,900 | 98.5 | 0.45 | 8.8 |
| Example 4 | 1.92 | 55,800 | 98.6 | 0.44 | 8.6 |
| Example 5 | 1.40 | 49,300 | 98.7 | 0.44 | 7.2 |
| Comparative Example 1 | 0.41 | 42,500 | 99.3 | 0.43 | 3.7 |
| Comparative Example 2 | 0.20 | 45,100 | 98.7 | 0.43 | 5.3 |

Industrial applicability

The solid catalyst component and the catalyst of the present invention have a high activity and a superior hydrogen response. The polyolefin having a high melt flow and high stereoregularity can be produced in high yield by polymerizing olefins by using the polymerization catalyst of the present invention. As the result, the problems such as an increase of the cost caused by an improvement of a facility and the increase of hydrogen to be used or a decline of productivity can be resolved.

What is claimed is:

1. A solid catalyst component comprising magnesium, titanium, an electron donor compound and a halogen, which is prepared by contacting a magnesium compound, a titanium compound of the formula $Ti(OR^{11})_nX_{4-n}$ where $R^{11}$ is a $C_{1-4}$ alkyl group, X is selected from the group consisting of chlorine, bromine and iodine, and n is 0 or an integer of from 1 to 3, and an electron donor compound and which satisfies the following equation (1):

$$0.5 \leq S1/S2 \leq 10 \quad (1)$$

wherein S1 and S2 are values determined by Raman spectroscopy analysis, S1 is a value of peak area of the strongest peak appearing in the range from 360 to 520 cm$^{-1}$ and S2 is a value of peak area of the strongest peak appearing in the range from 160 to 340 cm$^{-1}$.

2. A solid catalyst component as claimed in claim 1, wherein said electron donor compound is a diester of an aromatic dicarboxylic acid.

3. A solid catalyst component as claimed in claim 2, wherein said electron donor compound is a dialkyl phthalate having a $C_{6-12}$ alkyl group.

4. A solid catalyst component as claimed in claim 1, wherein the content of said electron donor compound is 10 to 30% by weight.

5. A catalyst, prepared from the following components (A), (B) and (C):

(A) the solid catalyst component as defined in claim 1;

(B) an organic aluminum compound represented by the general formula (2):

$$R^1_p AlQ_{3-p} \quad (2)$$

wherein $R^1$ represents a $C_{1-4}$-alkyl group; Q represents a hydrogen atom or a halogen atom; and p represents a real number of more than 0 to not more than 3; and (C) an organic silicon compound represented by the general formula (3):

$$R^2_q Si(OR^3)_{4-q} \quad (3)$$

wherein $R^2$ are the same or different and represent a $C_{1-12}$-alkyl, cycloalkyl, phenyl, vinyl, allyl or aralkyl group; $R^3$ are the same or different and represent a $C_{1-4}$-alkyl, cycloalkyl, phenyl, vinyl, allyl or aralkyl group; and q represents 0 or an integer of from 1 to 3.

6. A solid catalyst component as claimed in claim 1, wherein said solid catalyst component is obtained by contacting the following components (a) to (d): (a) a dialkoxymagnesium or a diaryloxymagnesium represented by the general formula $Mg(OR^7)(OR^8)$, wherein $R^7$ and $R^8$ are the same or different and each represents a $C_{1-10}$ alkyl or aryl group; (b) a titanium halide or an alkoxy titanium halide represented by the general formula $Ti(OR^{11})_nX_{4-n}$, wherein $R^{11}$ represents a $C_{1-4}$ alkyl group, X represents a halogen atom selected from the group consisting of chlorine, bromine and iodine and n represents 0 or an integer of from 1 to 3;

(c) a dialkyl phthalate having a $C_{6-12}$ alkyl group; and (d) an aromatic hydrocarbon of liquid state at room temperature.

7. A solid catalyst component as claimed in claim 6, wherein said solid catalyst component is prepared by reacting after said component (b) at 0 to 30° C. for 10 minutes to 3 hours with a suspension of said component (a) in said component (d), and by contacting one or more of said component (c) at −20 to 130° C. before or after said component (b) is contacted with said suspension.

8. A solid catalyst component as claimed in claim 6, wherein said solid catalyst component is prepared by reacting said component (b) with a suspension of said component (a) in said component (d) at 0 to 30° C. for 10 minutes to 3 hours, and by contacting one or more of said component (c) before or after said component (b) is contacted with said suspension, and by reacting said components (a) to (d) at 50 to 90° C.

9. A solid catalyst component as claimed in claim 1, wherein said solid catalyst component satisfies the relation $0.7 \leq S1/S2 \leq 8$.

10. A solid catalyst component as claimed in claim 1, wherein said solid catalyst component satisfies the relation $0.9 \leq S1/S2 \leq 5$.

* * * * *